(12) United States Patent
Tan et al.

(10) Patent No.: US 8,513,914 B2
(45) Date of Patent: Aug. 20, 2013

(54) UNIVERSAL BATTERY CHARGER

(75) Inventors: William Tan, Los Angeles, CA (US); David Goetz, Los Angeles, CA (US)

(73) Assignee: Mizco International Inc., Avenel, NJ (US)

( * ) Notice: Subject to any disclaimer, the term of this patent is extended or adjusted under 35 U.S.C. 154(b) by 347 days.

(21) Appl. No.: 12/984,501

(22) Filed: Jan. 4, 2011

(65) Prior Publication Data

US 2011/0187324 A1 Aug. 4, 2011

Related U.S. Application Data

(60) Provisional application No. 61/292,858, filed on Jan. 7, 2010.

(51) Int. Cl.
*H01M 10/46* (2006.01)

(52) U.S. Cl.
USPC .......................................................... 320/107

(58) Field of Classification Search
USPC ........... 320/106, 107, 112, 114, 115; 429/96, 429/98, 100; D13/103
See application file for complete search history.

(56) References Cited

U.S. PATENT DOCUMENTS

| | | |
|---|---|---|
| 5,157,318 A | 10/1992 | Wang |
| 5,357,185 A | 10/1994 | Chen |
| 6,268,709 B1 * | 7/2001 | Lee et al. ...................... 320/112 |
| 6,337,558 B1 | 1/2002 | Yuen et al. |
| 7,187,156 B2 * | 3/2007 | Nakasho et al. .............. 320/107 |
| 7,999,508 B2 * | 8/2011 | Yang ............................. 320/114 |
| 2001/0008373 A1 | 7/2001 | Kim |
| 2006/0255763 A1 | 11/2006 | Lung Tong |
| 2008/0185992 A1 | 8/2008 | Hoffman et al. |

OTHER PUBLICATIONS

International Search Report and Written Opinion for International Application No. PCT/US2011/020140, International Search Authority, dated Jun. 3, 2011.

* cited by examiner

*Primary Examiner* — Edward Tso
(74) *Attorney, Agent, or Firm* — Arent Fox LLP

(57) ABSTRACT

A battery charger includes a housing defining a battery receptacle area configured to receive a battery therein, a piston, a moveable platform, wherein the piston and the platform are simultaneously urged in substantially orthogonal directions toward the battery receptacle area, and prongs configured to extend from the housing and electrically connect a power source to the battery when the battery is received in the battery receptacle area and engaged by the piston and moveable platform. A method for charging a battery includes connecting a pair of prongs of a battery charger to a power source and placing a battery into a battery receptacle area of the battery charger, wherein the battery is simultaneously maintained in a vertical charging position and a horizontal charging position. A method of manufacturing a battery charger assembly includes providing a housing and providing a piston and a moveable platform internal to the housing.

19 Claims, 22 Drawing Sheets

UNIVERSAL BATTERY CHARGER

BACKGROUND

I. Field

The following description relates generally to recharging a variety of batteries, and more particularly to a universal battery charger.

II. Background

The evolving market for battery-powered electronic imaging devices, cellular phones, computers, peripherals, and other electronic devices has grown incredibly. As each new generation of these products is introduced, devices with more capabilities and better specifications, with lower weight and smaller size, are joining the cordless brigade. For example, audio/video capture systems such as camcorders are becoming more and more portable—even while increasing in resolution and fidelity.

Manufacturing electronic devices smaller and making them battery-powered, however, does not necessarily make them completely portable. Because of battery capacity, equipment run-times are normally less than desired. Battery charging typically require more time than the use of the battery. Moreover, each device typically has required its own dedicated battery and matched charger. Thus, for example, even if a consumer purchases a camcorder and a camera from the same manufacturer, each of these devices will undoubtedly require its own specific battery as well as matched charger.

Presently, there exists several dozen unique battery form factors for cameras. Cellular phones account for another several dozen different battery configurations- some with three or four separate power ratings. Camcorder makers have attempted to standardize on a few battery form factors, but these too come in multiple power ratings. Countless varieties of other individual types of battery cells are commonly used in photographic equipment, games, appliances and other applications.

One of the reasons for the proliferation of chargers is that prior art chargers are product-specific, with added constraints on size, speed, power supply and compatibility with various battery chemistries. A dedicated charger for each of these batteries, or even for each type of these batteries, becomes economically and physically prohibitive. Likewise, adaptability to different AC and DC charging power sources is frequently lacking.

Implementation of many charging systems requires an electromechanical connection between the battery and charger that is designed for that single type of battery. However, it is apparent that a dedicated external charger for every new type and configuration of portable battery becomes less economically attractive with the acquisition by the consumer of more devices.

When the size and weight penalty imposed by the need for multiple spare batteries and chargers is combined with a disparate ratio of charge-time to run-time and the constant need for multiple nearby AC outlets, it can be seen that true portability will remain more an idealistic goal than a practical reality if all the power accessories that are needed to maintain portability weigh down the consumer.

Consequently, it would be desirable to address one or more of the deficiencies described above.

SUMMARY

In accordance with certain aspects of the present invention, a battery charger includes a housing defining a battery receptacle area configured to receive a battery therein, a piston, a moveable platform, wherein the piston and the platform are simultaneously urged in substantially orthogonal directions toward the battery receptacle area, and prongs configured to extend from the housing and electrically connect a power source to the battery when the battery is received in the battery receptacle area and engaged by the piston and moveable platform.

In accordance with yet other aspects of the present invention, a method for charging a battery includes connecting a pair of prongs of a battery charger to a power source and placing a battery into a battery receptacle area of the battery charger, wherein the battery is simultaneously maintained in a vertical charging position by a platform exerting a substantially uniform vertical pressure against a lower surface of the battery and a horizontal charging position by a piston exerting a substantially uniform horizontal pressure against a side surface of the battery.

In accordance with another aspect of the present invention, a method of manufacturing a battery charger assembly includes providing a housing configured to define a battery receptacle for receiving a battery therein, providing a piston internal to the housing that is urged toward the battery receptacle area by a spring, and providing a moveable platform internal to the housing that is urged toward the battery receptacle area by a spring, wherein a direction in which the piston is urged is substantially orthogonal to a direction in which the platform is urged.

It will become readily apparent to those skilled in the art from the following detailed description, wherein it is shown and described only exemplary configurations of a universal battery charger. As will be realized, the invention includes other and different aspects of an applicator and assembly and the various details presented throughout this disclosure are capable of modification in various other respects, all without departing from the spirit and scope of the invention. Accordingly, the drawings and the detailed description are to be regarded as illustrative in nature and not as restrictive.

BRIEF DESCRIPTION OF THE DRAWINGS

(FIG. 1)

DETAILED DESCRIPTION

Figure 1:
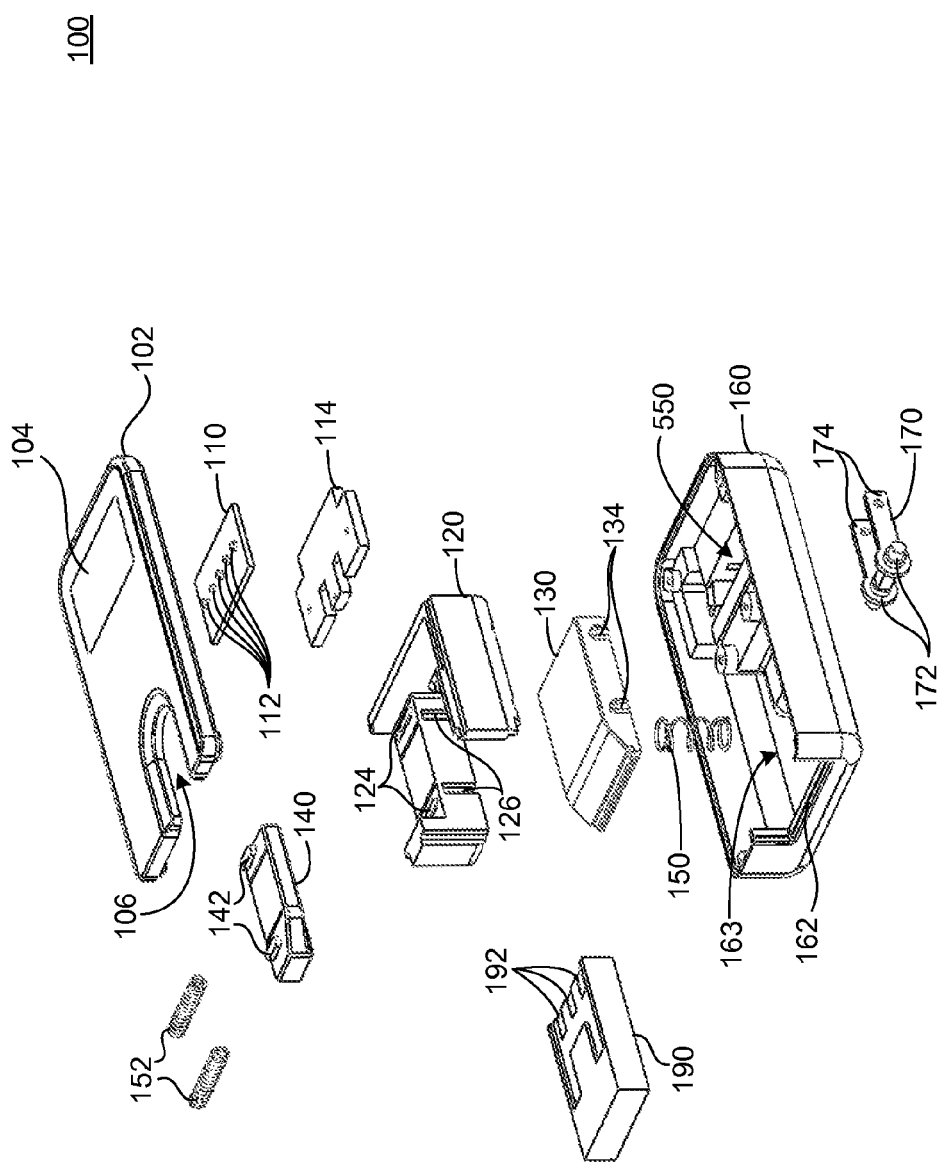
FIG. 1 is a right exploded perspective view of the parts of a universal battery charger configured in accordance with one aspect of the disclosure.

Various aspects of the novel systems, apparatus, and methods are described more fully hereinafter with reference to the accompanying drawings. The teachings disclosed herein may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein.

Various aspects of a universal battery charger may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of a universal battery charger in addition to the orientation depicted in the drawings. By way of example, if a universal battery charger in the drawings is turned over, elements described as being on the "bottom" side of the other elements would then be oriented on the "top" side of the other elements. The term "bottom" can therefore encompass both an orientation of "bottom" and "top" depending on the particular orientation of the apparatus.

Various aspects of a universal battery charger may be illustrated with reference to one or more exemplary embodiments. As used herein, the term "exemplary" means "serving as an example, instance, or illustration," and should not necessarily be construed as preferred or advantageous over other embodiments of a universal battery charger disclosed herein.

Figure 2:
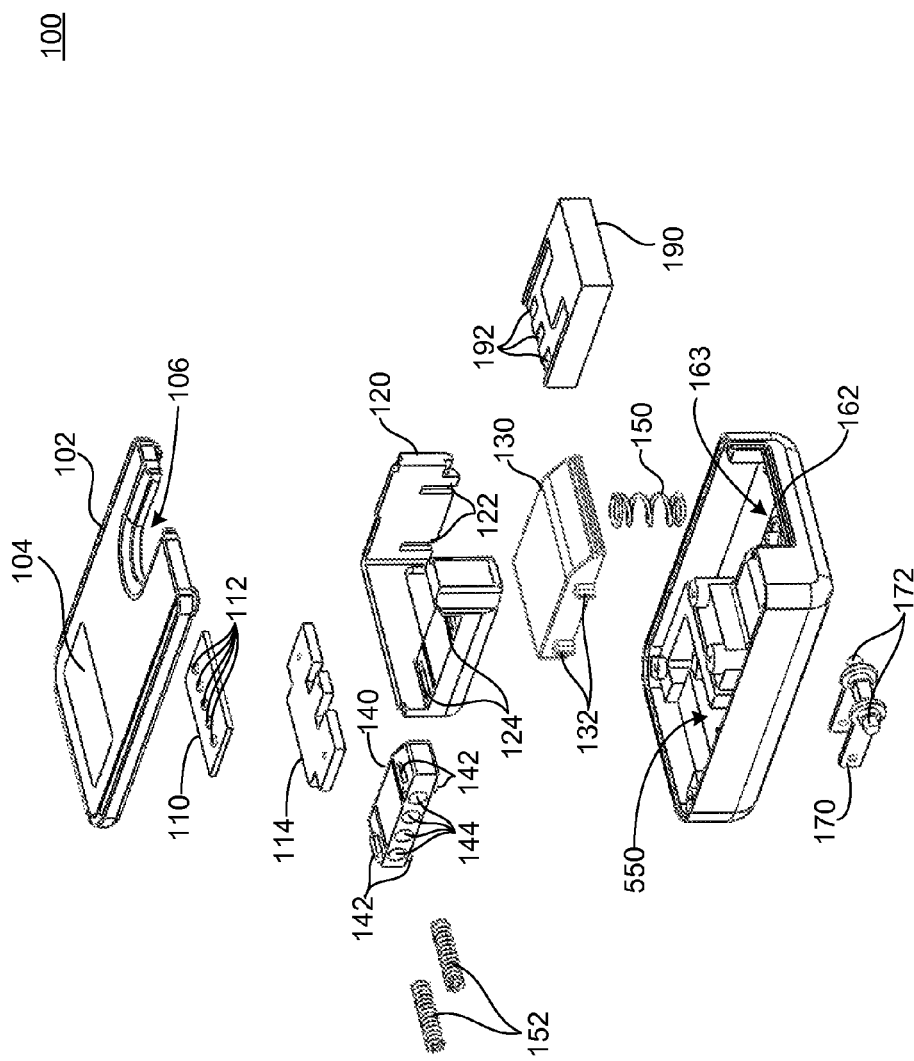
FIG. 2 is a left exploded perspective view of the parts of a universal battery charger configured in accordance with one aspect of the disclosure.

FIG. 1 is a right exploded perspective view of an exemplary universal battery charger 100 configured in accordance with one aspect of the disclosure, which is adapted to be able to operate with a variety of batteries of different sizes from a particular company, such as camera and/or camcorder batteries. Typically, batteries supplied by each company have the same voltage levels, and often only differ in physical aspects such as size. In many cases, the size is directly proportional to the amount of power storage of which the battery is capable because the size is based on the number of cells in each battery. A left exploded perspective view of the universal battery charger is illustrated in FIG. 2.

The universal battery charger 100 may include an outer housing 101 (see also FIGS. 3 and 4) for protection of the electrical circuitry contained therein as well as for protection of the battery during charging. The outer housing 101 may be comprised of a cover 102 secured to a base portion 160 and may be made of any suitable non-conductive, impact resistant material, such as a hard plastic material, for example. The base portion 160 may be configured with an opening 162 so that, when the cover 102 is secured to the base portion 160, the opening 162 provides access to an internal battery receptacle area 166 for receiving and securing a battery into the housing 101.

The cover 102 may be configured with a window 104 through which a display circuit board 110, used for displaying the charge/discharge status of the battery 190, may be seen, as further described below. The display circuit board 110 may be used to display a charge/discharge completion time (e.g., estimated charge completion time), battery charge/discharge cycle time, current charging voltage, life of battery estimation, whether the charger is charging at a trickle charge rate, and other battery-related information. In one aspect of the disclosure, the display circuit board 110 may be implemented using one or more light emitting diodes (LEDs), such as an arrangement of LEDs 112 mounted on the top surface of the display circuit board 110. The display circuit board 110 may also be implemented using liquid crystal displays (LCDs), analog displays (e.g., an analog meter), or other suitable means of displays.

The display circuit board 110 may be controlled by a main circuit board 114 capable of charging batteries of multiple voltages and having circuitry that automatically or manually adapts to the power profiles of different batteries, including voltage, total power capacity, battery chemistry type and recharging rate. In accordance with one aspect of the disclosure, the main circuit board 114 may include an automatic multi-voltage switching circuit for use with power outlets worldwide without additional adapters or attachments. In accordance with other aspects, the main circuit board 114 may be adapted to operate with the power supplied by a particular region, such as the 110-120V power used in the United States or the 220-240V power used in European countries. The base portion 160 may be configured with an opening 550 into which the main circuit board 114 and the display circuit board 110 are positioned.

In operation of the universal battery charger 100, a battery, such as the battery 190 with contacts 192 depicted in FIGS. 1 and 2, may be inserted through the opening 162 in the base portion 160 to be received into the battery receptacle area 166. According to one aspect of the present invention, an access slot 106 may be provided on the cover 102 to provide additional clearance for a user's finger, for example, to slidably insert the battery 190 into a position of contact with a plurality of pins 800. Thus, the contacts 192 may be electrically coupled to the main circuit board 114 using the appropriate pins from the plurality of pins 800, as seen in the various elevational views illustrated by FIGS. 8, 11, 12 and 13.

In one aspect of the disclosure, the plurality of pins 800 may be resiliently held into place by a frame 120 and the battery 190 may be held in a secure manner both (i) vertically and (ii) horizontally through the compression forces of (i) at least one bottom spring 150 pushing a platform 150 against the bottom of the battery 190, and (ii) one or more side springs 152 pushing a piston 140 against the side of the battery 190, respectively.

The frame 120, in one aspect of the disclosure, may include one or more slots 124 that are matched to guides 142 on the piston 140, the guides 142 being configured to slidably engage the one or more slots 124. One or more slots may also be provided on a bottom surface of the top cover (not shown) that are configured to slidably engage guides 142 on the piston 140. Thus, the guides 142 may engage the slots 124 in the frame 120 and/or the slots on the bottom surface of the cover 102 to encourage movement of the piston 140 in a defined manner horizontally without skewing or twisting, which prevents the piston 140 from becoming jammed. Similarly, the platform 130 may include two pair of guides 132, 134, that are matched to two respective pair of slots 126, 122 on the frame 120 to encourage the platform 130 to move in a defined manner vertically without skewing or twisting, which can cause jams. In other aspects of the disclosure, any or all of the slots and guides may be eliminated or additional slots and guides may be added depending on the specific implementation. Generally, a larger platform 130 or piston 140 will require more guides and associated slots in the frame 120.

Figure 3:
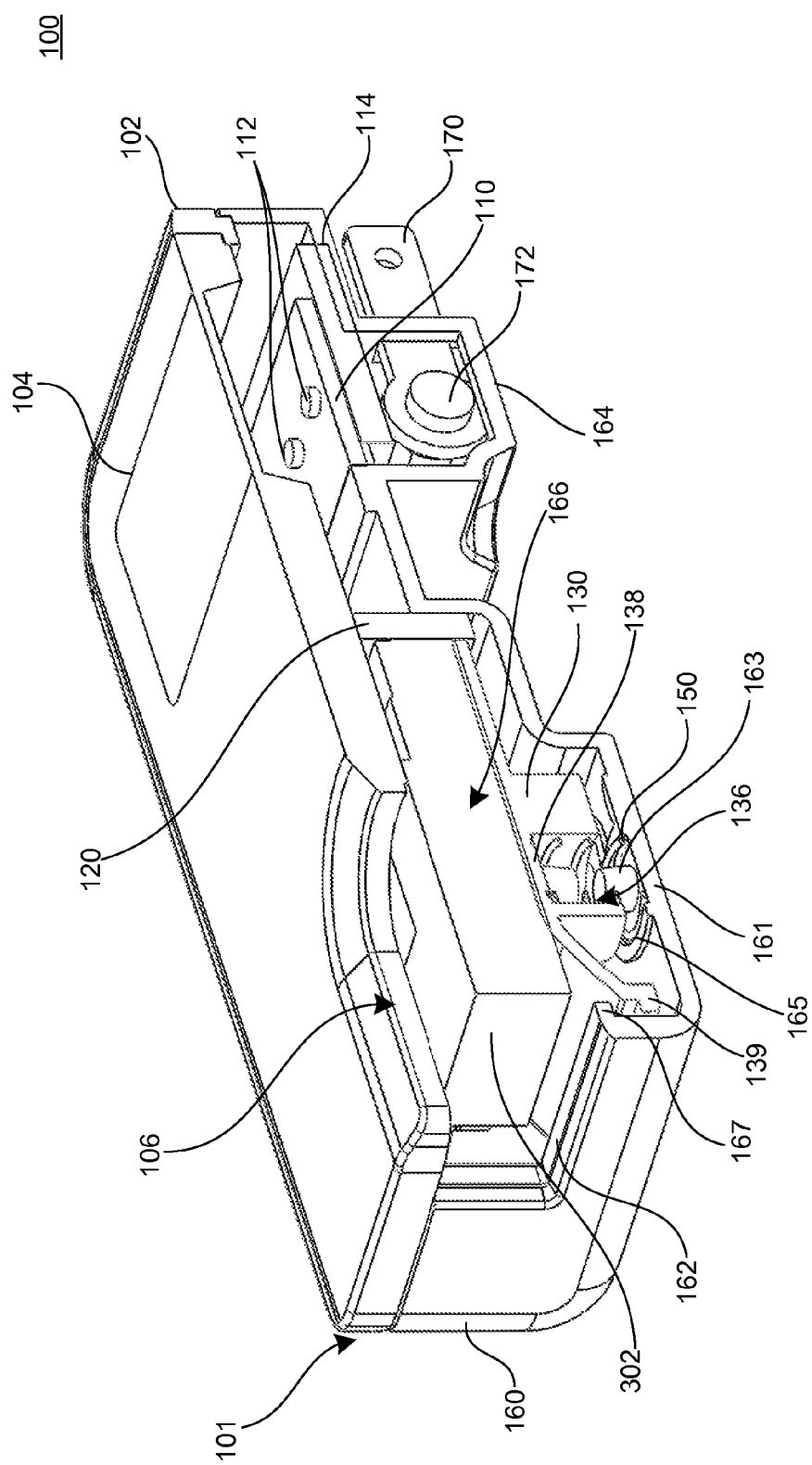
FIG. 3 is a first cross-sectional view illustrating a first battery inserted into the universal battery charger for charging, in accordance with certain aspects of the present invention.
Figure 4:
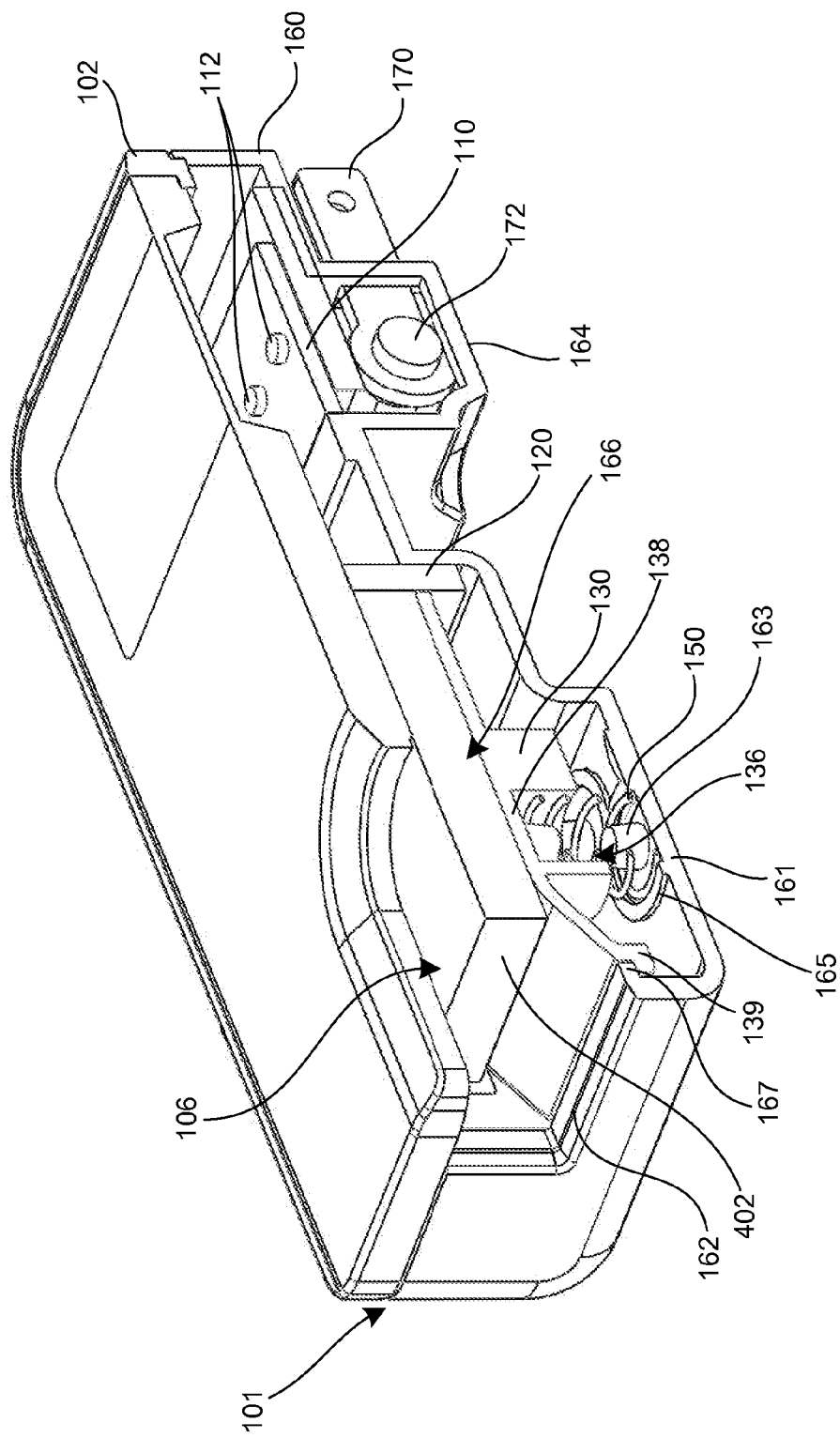
FIG. 4 is a second cross-sectional view illustrating a second battery inserted into the universal battery charger for charging, in accordance with certain aspects of the present invention.

The platform 130 may be configured with a spring seat for mounting the bottom spring 150 in a secured position. For example, as shown in FIGS. 3 and 4, the spring seat 136 may comprise a cylindrical bore formed in a thicker portion of the platform 130, the bore extending from an upper platform plate 138 and having a diameter that is slightly greater than or equal to an outer radial diameter of the bottom spring 150. When assembled, an end portion of the bottom spring 150 may be inserted into the spring seat 136 so that the bottom spring 150 is compressed between a bottom wall 161 of the base portion 160 and the platform plate 138 of the platform 130. In this manner, the platform 130 is continuously urged upward by the spring force toward the battery receptacle area 166. The bottom wall 161 of the base portion 160 may be formed with additional spring securing features, such as a spring post 163 and a retaining ring 165, for example, to further ensure a secure positioning of the bottom spring 150. Thus, in combination with the guides 134, the spring seat 136 and the additional spring securing features may ensure the proper positioning and vertical movement of the platform 130. According to another aspect of the present invention, the platform 130 may be configured with a detent 139 that engages a lip 167 configured on the base portion 160 to provide an upper limit on the extent to which the platform 130 may move upward into the battery receptacle area 166.

Figure 5:
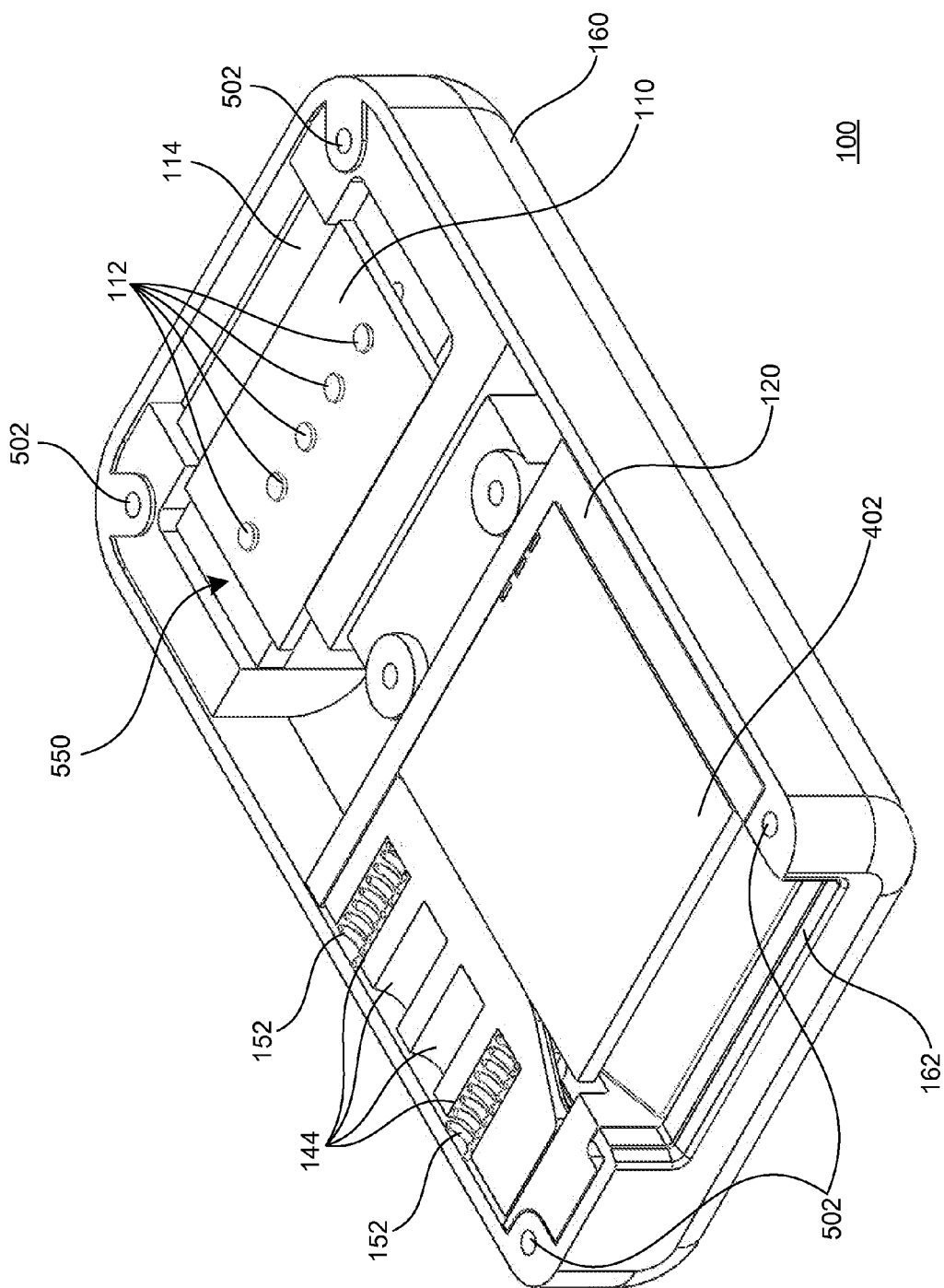
FIG. 5 is a third cross-sectional view illustrating the second battery inserted into the universal battery charger for charging, in accordance with certain aspects of the present invention.

The piston 140 may be configured with spring seats 144 for mounting the side springs 152 in a secured position. For example, as shown in FIG. 5, the spring seats 144 may comprise bores extending into a side surface of the piston 140 that have a diameter slightly greater than or equal to an outer radial diameter of the side springs 152. When assembled, an end of the side springs 152 may be inserted into the spring seats 144 so that the side springs 152 are compressed between a side wall 167 of the base portion 160 and an inner wall 145 of the spring seat 144. In this manner, the piston 140 may be continuously urged inward toward the battery receptacle area 166.

Figure 7:
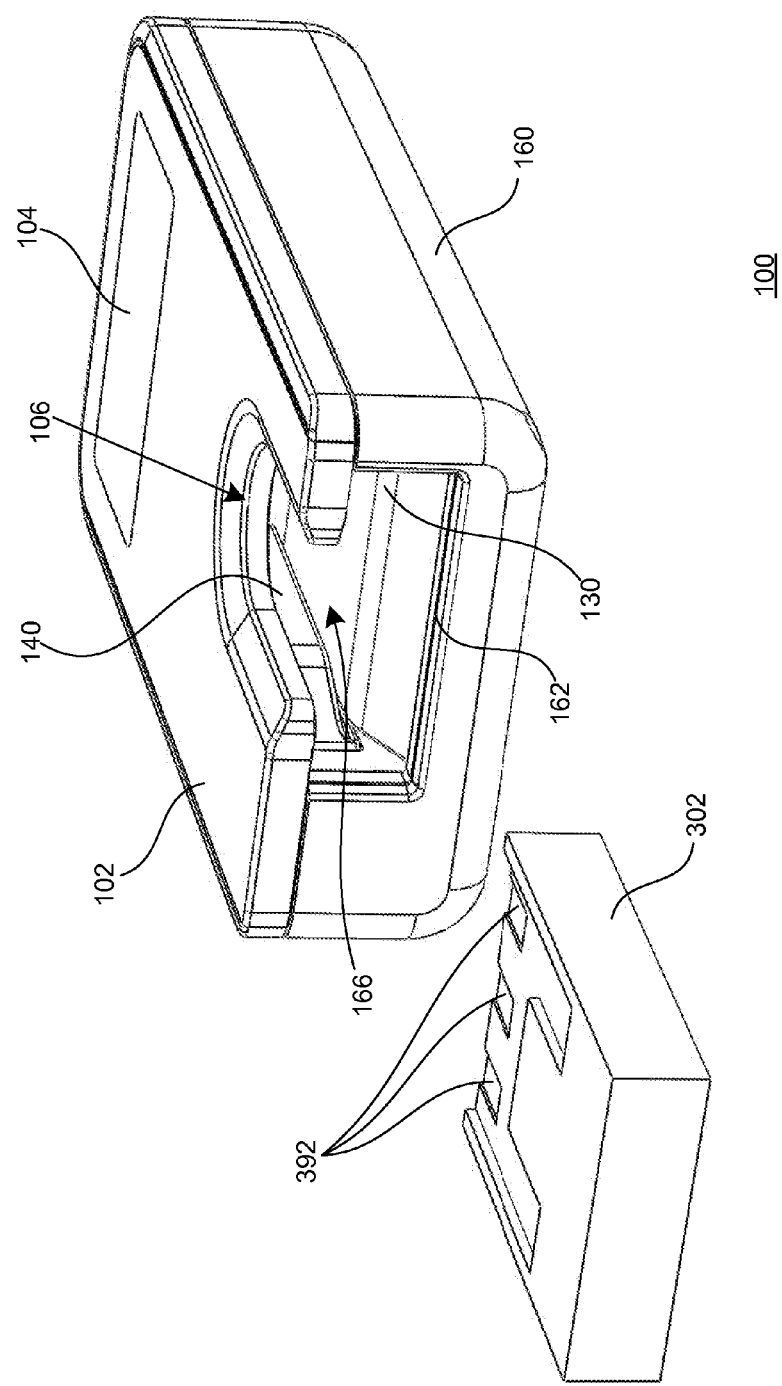
FIG. 7 is a perspective view of the first battery being inserted into the universal battery charger, in accordance with certain aspects of the present invention.
Figure 8:
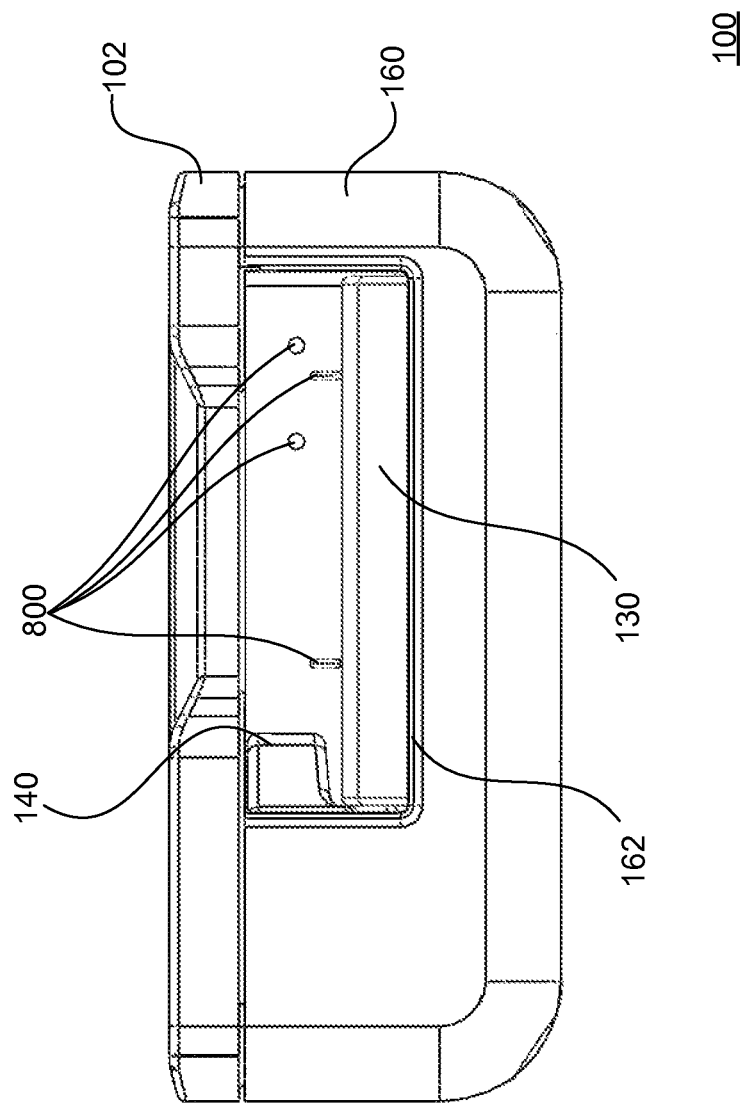
FIG. 8 is a front elevation view of the universal battery charger before the first battery is inserted into the universal battery charger, in accordance with certain aspects of the present invention.

The frame 120, platform 130, and piston 144 may be coupled together by way of the various guides and slots and mounted into the base portion 160 of the universal battery charger 100 with the bottom and side springs 150 and 152 respectively positioned as described above. The cover 102 may be secured to the base portion 160 in order to secure and maintain the internal components and circuitry of the universal battery charger 100 therein. As shown in FIGS. 7 and 8, for example, the platform 130 and the piston 140 extend into the battery receptacle area 166 and are capable of receiving a battery of varying dimensions. The platform 130 and the piston 140 may include slanted or beveled leading surfaces, for example, to further enable the easy insertion and acceptance of the battery into the battery receptacle area 166.

Figure 6:
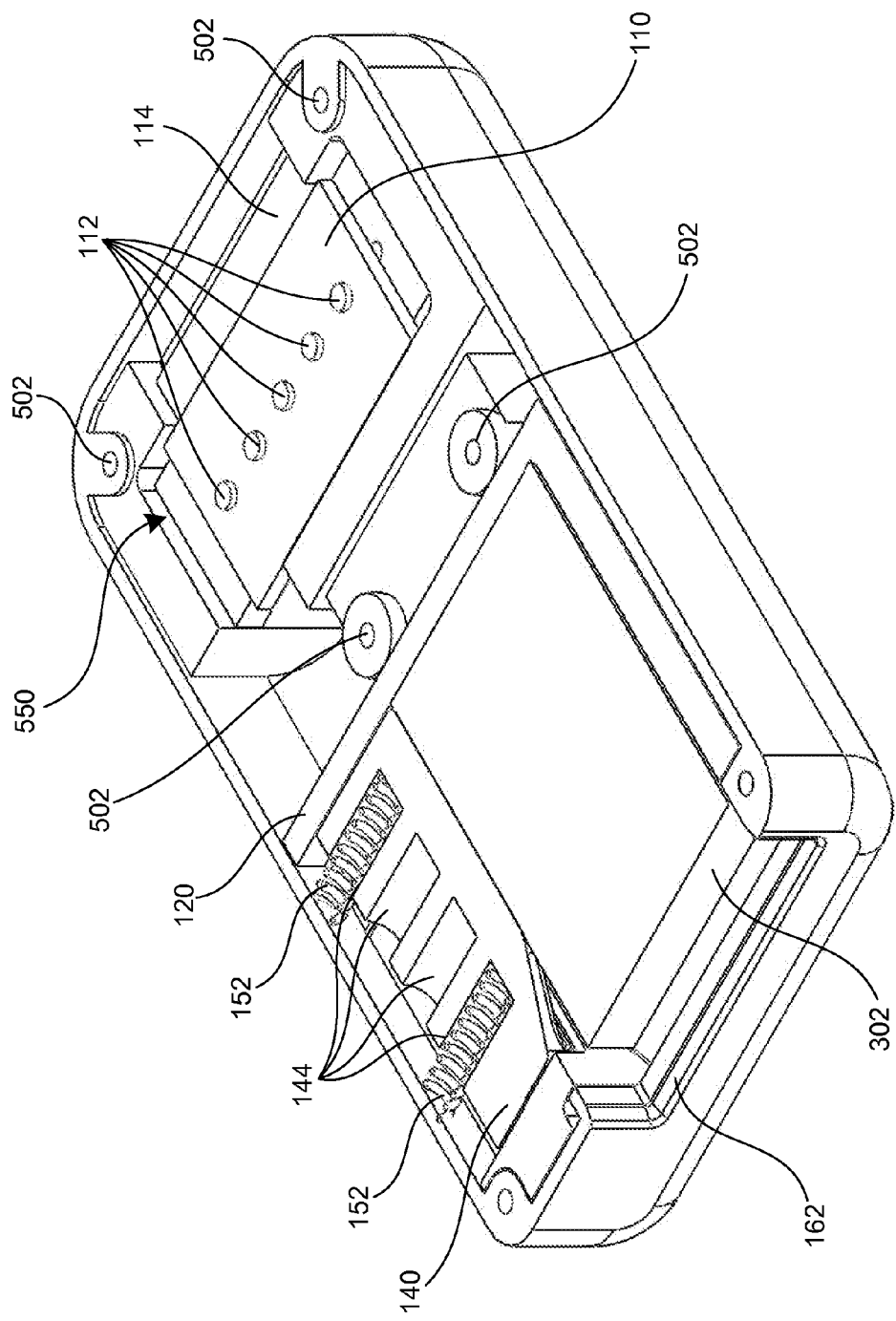
FIG. 6 is a fourth cross-sectional view illustrating the first battery inserted into the universal battery charger for charging, in accordance with certain aspects of the present invention.
Figure 9:
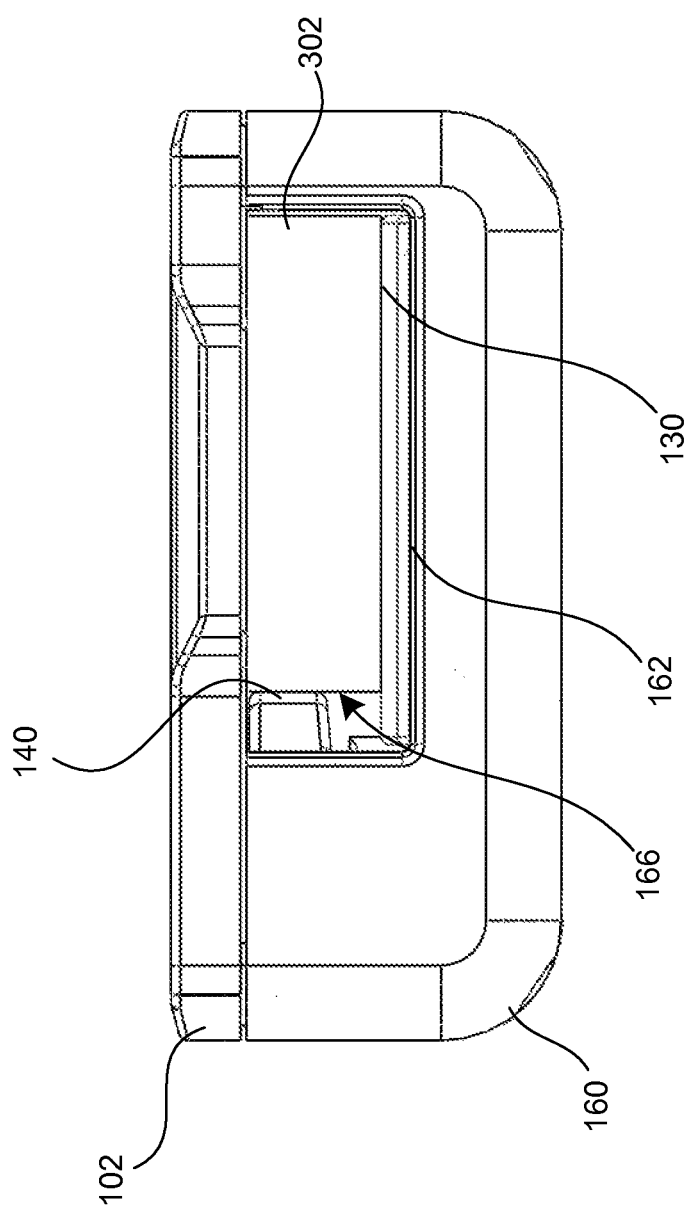
FIG. 9 is a front elevation view of the universal battery charger after the first battery has been inserted into the universal battery charger, in accordance with certain aspects of the present invention.
Figure 12:
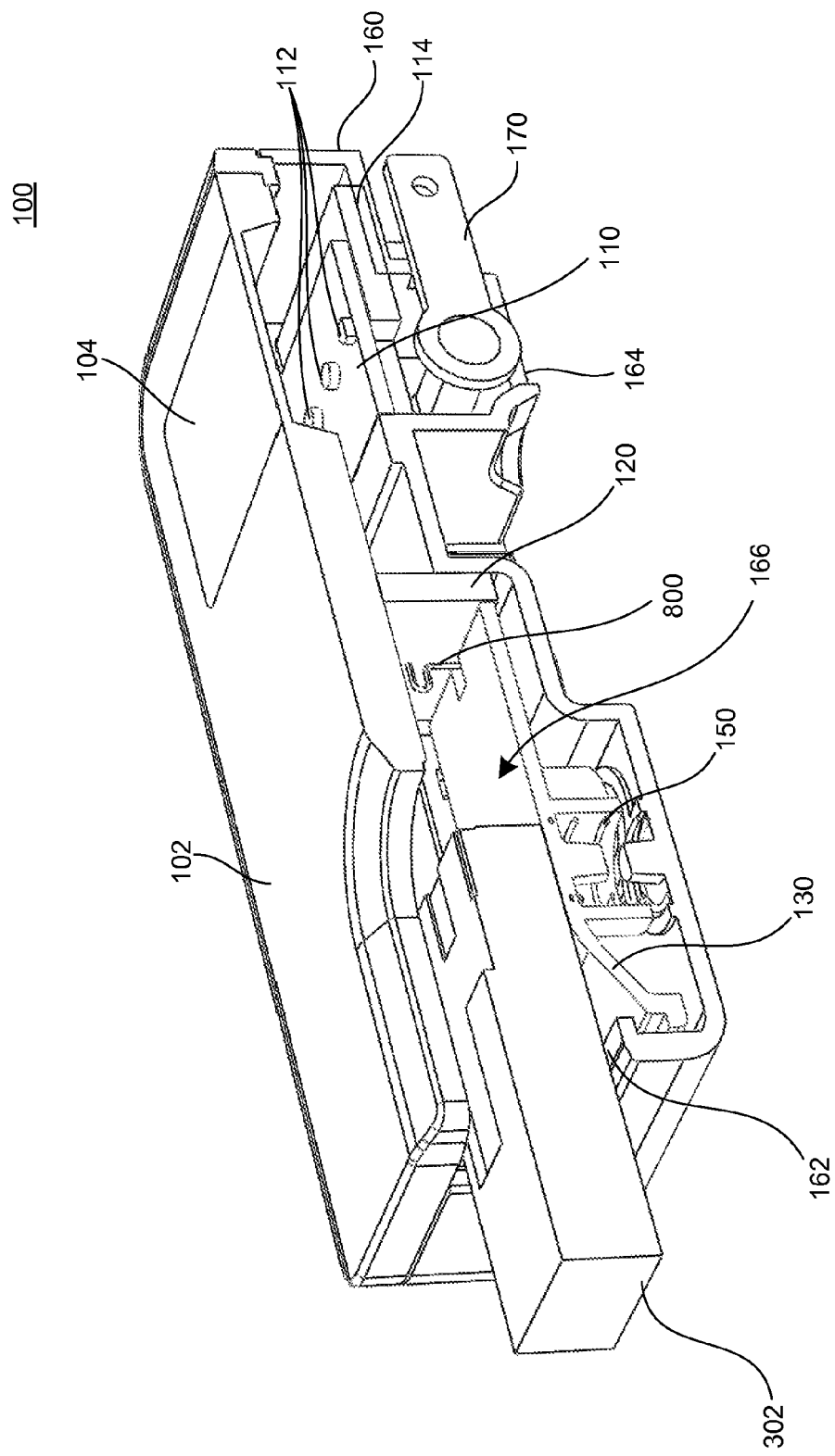
FIGS. 12 and 13 are cross-sectional views of the universal battery charger, in accordance with certain aspects of the present invention.
Figure 13:
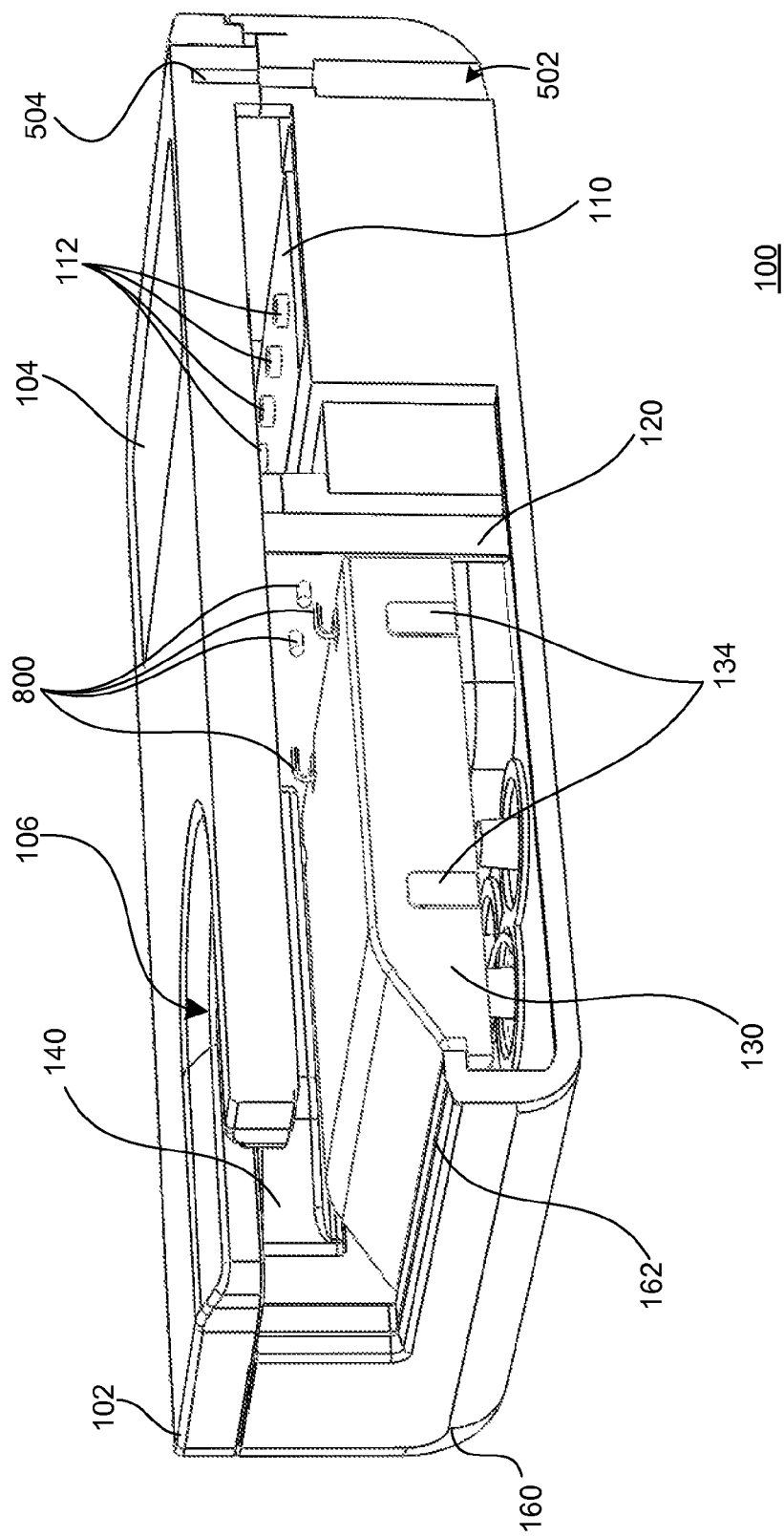

As shown in FIG. 3, a first battery 302 with contacts 392 may be inserted through the opening 162 of the base portion 160 and received into the battery receptacle area 166 so that contacts on the battery engage the pins 800. FIG. 12 is a cross-section view of the first battery 302 being inserted into the opening 162. The first battery 302 may be effectively clamped vertically between a lower surface of the cover 102 and an upper surface of the platform 130 as a result of the force of the bottom spring 150 being distributed by the platform 130 to exert a substantially uniform upward pressure against a lower surface of the first battery 302. Similarly, as shown in FIGS. 6 and 9, the first battery 302 may be effectively clamped horizontally between the piston 140 and the frame 120 or a sidewall of the base portion 160 as a result of the force of the side springs 152 being distributed by the piston 140 to exert a substantially uniform inward pressure against a side surface of the first battery 302. The dually applied and distributed spring forces may simultaneously maintain the first battery 302 in a secure vertical and horizontal charging position.

Figure 10:
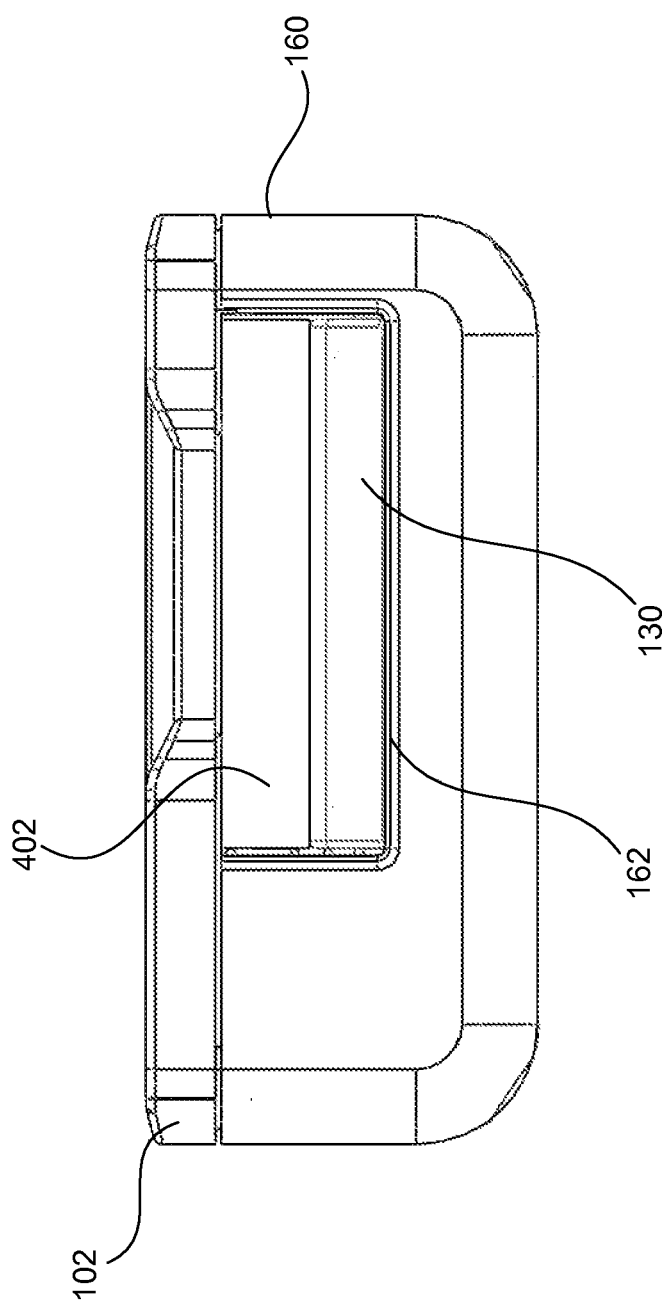
FIG. 10 is a front elevation view of the universal battery charger after the second battery has been inserted into the universal battery charger, in accordance with certain aspects of the present invention.
Figure 11:
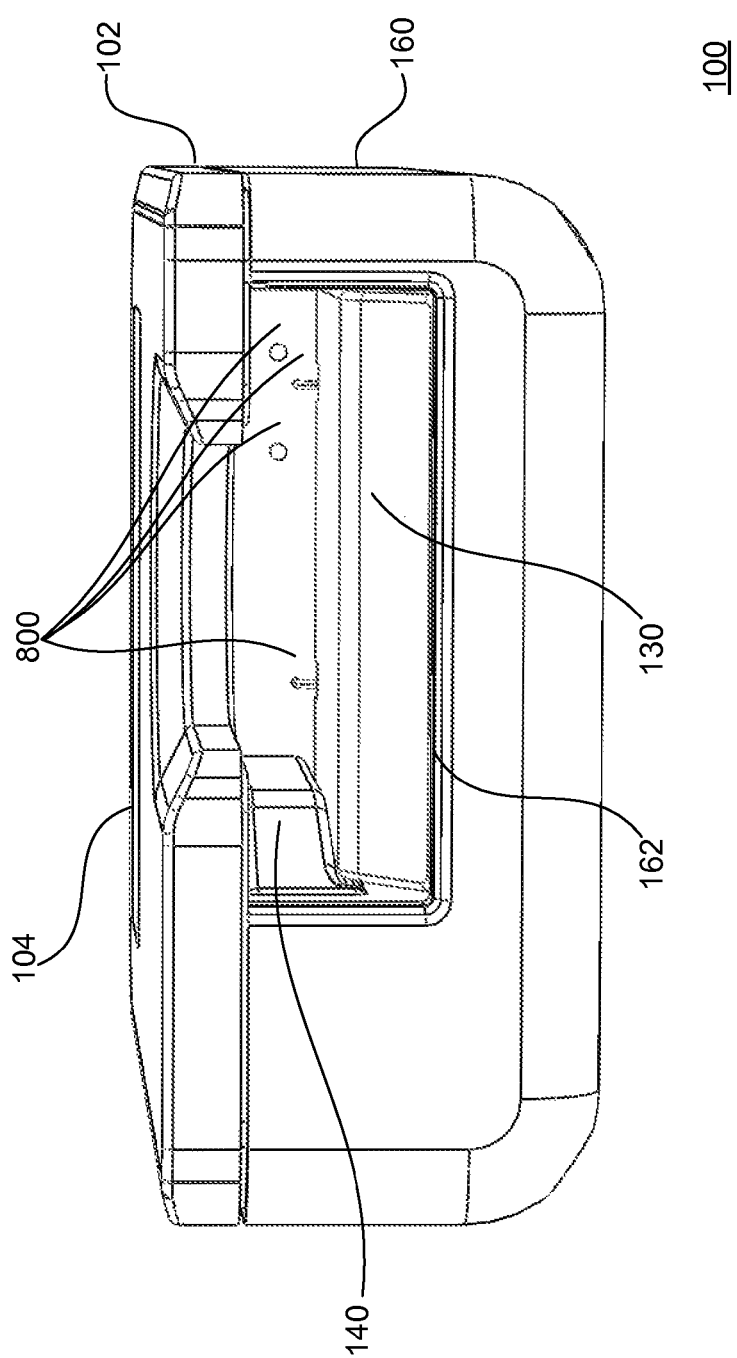
FIG. 11 is a front perspective view of the universal battery charger, in accordance with certain aspects of the present invention.

Referring to FIG. 4, a second battery 402 that is of a smaller size than the first battery 302 may be inserted into the opening 162 of the bottom housing 160. As described above, the second battery 402 may be maintained in an effective vertical charging position by being held secure against the bottom of the cover 102 due to the force of the bottom spring 150 on the platform 130 exerting a distributed upward pressure against a lower surface of the second battery 402. Also referring to FIGS. 5 and 10, it is illustrated that the second battery 402 may be maintained in an effective horizontal charging position by being held secure against the frame 120 or a side wall of the base portion 160 due to the force of the springs 152 on the piston 140 exerting a distributed inward pressure against a side surface of the second battery 402. In the case of a smaller battery, the access slot 106 may provide access for a user to effect positioning of the battery in the battery receptacle area 166. In another aspect of the present invention, the battery may be positioned in the battery receptacle area 166 simply by direct longitudinal pushing of a distal end of the battery through the opening 162.

As seen in FIGS. 5 and 6, the base portion 160 may include a plurality of screw holes 502 for securing the cover 102 using a plurality of screws. As further seen in FIG. 13, an example of a screw hole 504, into which a screw is inserted into a matching screw hole 502 in the base portion 160 may be secured, is shown in the top cover 102. Although shown with screw holes for securing the cover 102 to the base portion 160 with screws, any suitable securing means may be used, including adhesives, welding, heat bonding, tab and slot configurations, and press fitting, for example.

The universal battery charger 100 may be configured with a fold-away wall plug 170. As shown in FIGS. 1-4, the wall plug 170 may be built into the base portion 160 with a pair of prongs 174 that is electrically connected to the main circuit board 114. The fold-away wall plug 170 may include a rod 172 that is used to pivot the fold-away wall plug 170 from a first position, where the pair of prongs 174 is substantially flush with a lower surface 164 of the bottom housing 160, to a second position, where the pair of prongs 174 may be deployed to extend substantially orthogonally from the lower surface 164 to be inserted into a power outlet. In one aspect, the prongs 174 of the fold-away wall plug 170 may be changed to other shapes for compatibility with the power outlets of any country.

Figure 14:
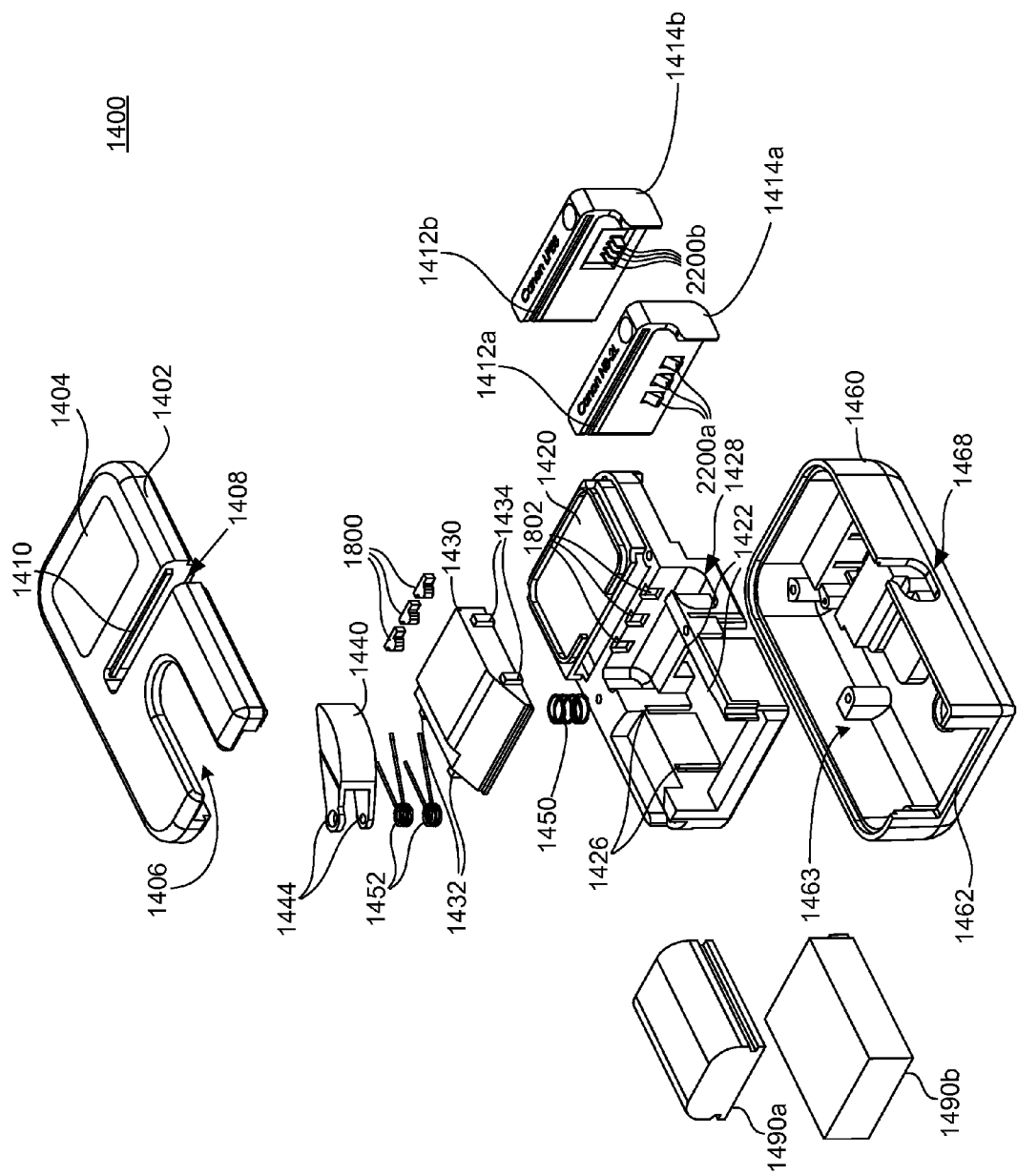
FIG. 14 is a right exploded perspective view of the parts of a second universal battery charger configured in accordance with one aspect of the disclosure.

FIG. 14 is a right exploded perspective view of a second exemplary universal battery charger 1400 configured in accordance with one aspect of the disclosure, which is adapted to be able to operate with a variety of batteries of different sizes for such devices as Digital Single-Lens Reflex (DSLR) cameras. Typically, batteries supplied by different companies have different voltage levels, and also differ in physical aspects such as in contact layout as well as size. In many cases, the size is directly proportional to the amount of power storage of which the battery is capable because the size is based on the number of cells in each battery. The second exemplary universal battery charger 1400 is able to operate with the various batteries supplied by different companies via a customized battery interface as further described herein.

Figure 16:
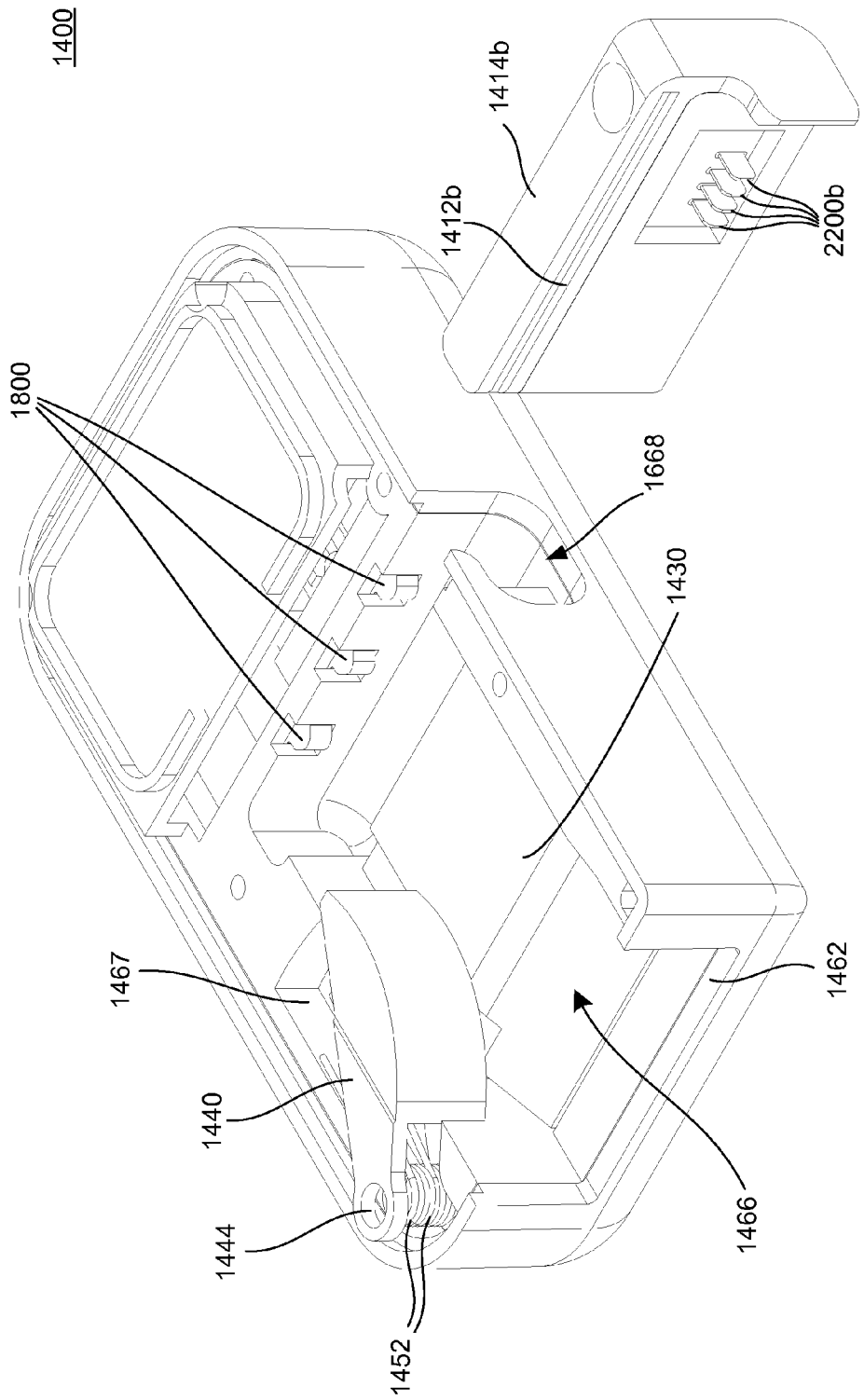
FIG. 16 is a perspective cross-sectional view of the second universal battery charge into which a customized battery interface may be inserted in accordance with certain aspects of the present invention.

The universal battery charger 1400 includes a cover 1402 secured to a base portion 1460 and may be made of any suitable non-conductive, impact resistant material, such as a hard plastic material, for example. The base portion 1460 may be configured with an opening 1462 so that, when the cover 1402 is secured to the base portion 1460, the opening 1462 provides access to an internal battery receptacle area 1466 (see also FIG. 16) for receiving and securing a battery such as batteries 1490a,b into the housing.

The cover 1402 may be configured with a window 1404 through which a display circuit board similar to the display circuit board 110 of the embodiment described in FIGS. 1-13, may be used for displaying the charge/discharge status of the batteries 1490a,b, as further described below. The display circuit board may be controlled by a main circuit board 114, similar to the main circuit board 114 of the previously described embodiment, which is also capable of charging batteries of multiple voltages and having circuitry that automatically or manually adapts to the power profiles of different batteries, including voltage, total power capacity, battery chemistry type and recharging rate. The main circuit board is accessed through a plurality of contacts 1800.

Figure 15:
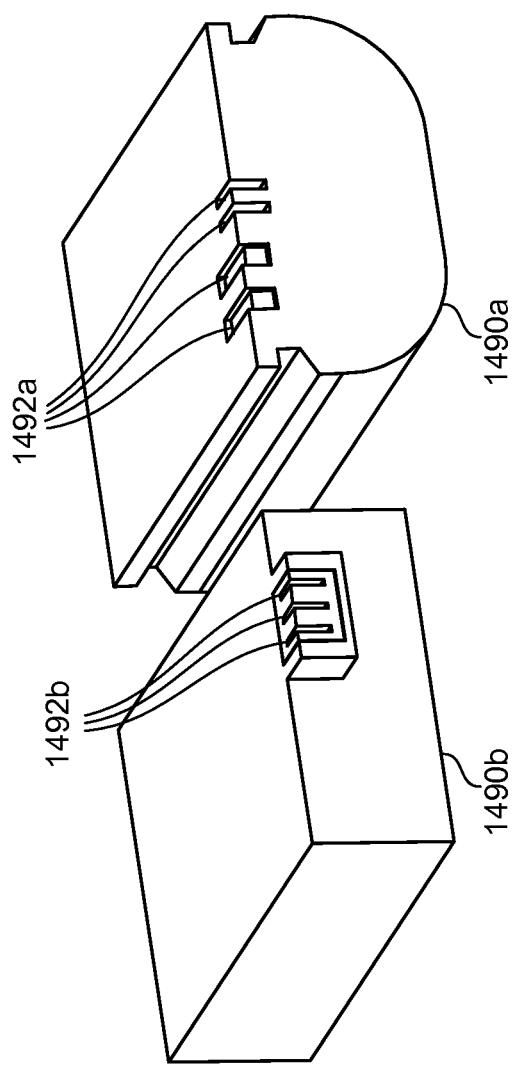
FIG. 15 is a perspective view of exemplary batteries with which the second universal battery charger of FIG. 14 may be used.

In operation of the universal battery charger 1400, a battery, such as the batteries 1490a,b with contacts 1492a,b depicted in FIG. 15, may be inserted through the opening 1462 in the base portion 1460 to be received into the battery receptacle area 1466. According to one aspect of the present invention, an access slot 1406 may be provided on the cover 1402 to provide additional clearance for a user's finger, for example, to slidably insert batteries 1490a,b into a position of contact with a plurality of contacts 2200a,b on custom battery interfaces 1414a,b. Thus, the contacts 1492a,b may be electrically coupled to the main circuit board of the charger using the appropriate contacts from the plurality of contacts 2200a,b, as seen in the various views illustrated by FIGS. 16-21 and as further described herein.

In one aspect of the disclosure, the plurality of contacts 1800 may be resiliently held into place by a frame 1420 and exposed via a plurality of openings 1802. A custom battery interface such as the custom battery interfaces 1414a,b may be used to provide customized interfaces between the plurality of contacts 1800 and the contacts for the batteries 1490a,b. For example, the custom battery interface 1414b may be used to electrically interface the contacts 1800 to the contacts 2200b so that the battery 1490b may be coupled to the main circuit board. The customized battery interfaces may be easily changed by a user inserting and removing the interfaces through an opening 1468 in the base portion 1460 and into an opening 1428 of the base 1420. The custom battery interfaces may be held securely by their insertion into a slot 1408 with retaining rails 1410 in the cover 1402 that is matched to such features as slots 1412a,b in the custom battery interfaces 1414a,b. After insertion, the custom battery interfaces 1414a,b are retained in an interface retaining portion 1668. Thus, batteries of various electrical contact arrangements, including batteries with different number of contacts, may be charged using the same main circuit board.

Figure 22:
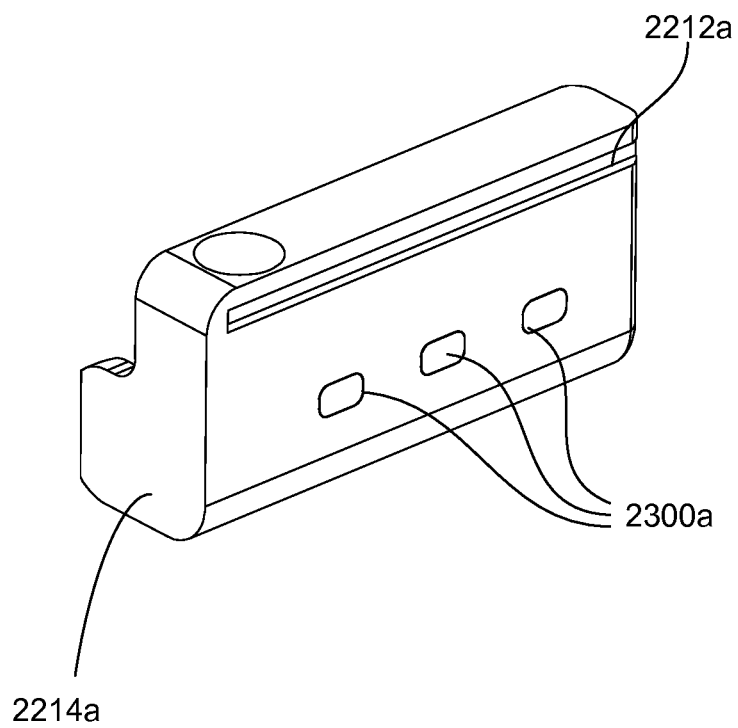
FIG. 22 is a rear perspective view of a custom battery interface of the second universal battery charger configured in accordance with certain aspects of the present invention.

FIG. 22 illustrates a plurality of contacts 2300a for the custom battery interface 2214a of the second universal battery charger 1400 configured in accordance with certain aspects of the present invention. As shown, the custom battery interface 2214a also include a slot 2212a to mate with retaining rails 1410 in the cover 1402, as discussed with the slot 1412a. As discussed above, the main circuit board is used to generate voltage and current to charge a variety of batteries that is connected to the second universal battery charger 1400. In order to interface with all the different batteries, different custom battery interfaces may be used, as shown above. It should be noted that any number of contacts may be used for electrically interfacing the main circuit board to a battery. Thus, the number of contacts in the plurality of contacts on the custom battery interface that is used to interface the main circuit board with the battery may be customized.

As discussed further below, a battery such as the battery 1490b may be held in a secure manner both (i) vertically and (ii) horizontally through the compression forces of (i) at least one bottom spring 1450 pushing a platform 1450 against the bottom of the battery 1490b, and (ii) one or more side springs 1452 pushing a piston such as an arm 1440 against the side of the battery 1490b, respectively. Thus, batteries of various sizes may be held securely within the universal battery charger 1400.

The frame 1420, in one aspect of the disclosure, may include one or more slots that are used to retain guides on the platform 1430. For example, the platform 1430 may include two pair of guides 1432, 1434 that are matched to two respective pair of slots 1426, 1422 on the frame 1420 to encourage the platform 1430 to move in a defined manner vertically without skewing or twisting, which can cause jams. In other aspects of the disclosure, any or all of the slots and guides may be eliminated or additional slots and guides may be added depending on the specific implementation. Generally, a larger platform 1430 will require more guides and associated slots in the frame 1420.

The platform 1430 may be configured with a spring seat for mounting the bottom spring 1450 in a secured position. Similar to the use of the spring seat 136 of the earlier described embodiment, as shown in FIGS. 3 and 4, when assembled, an end portion of the bottom spring 1450 may be inserted into the so that the bottom spring 1450 is compressed between a bottom wall of the base portion 1460 and the platform 1430. In this manner, the platform 1430 is continuously urged upward by the spring force toward the battery receptacle area 1466. The bottom wall of the base portion 1460 may be formed with additional spring securing features, such as a spring post 163 and a retaining ring 165 of the previous embodiment, for example, to further ensure a secure positioning of the bottom spring 1450. Thus, in combination with the guides 1434, the spring seat and the additional spring securing features may ensure the proper positioning and vertical movement of the platform 1430. According to another aspect of the present invention, the platform 1430 may be configured with a detent that engages a lip configured on the base portion 1460 to provide an upper limit on the extent to which the platform 1430 may move upward into the battery receptacle area 1466.

The arm 1440 may be configured with spring retaining tabs 1444 for retaining the side springs 1452 in a secured position. For example, the arm 1440 may comprise openings 1446 extending into a surface of the tabs 1444 for a pin (not shown) to secure the side springs 1452. When assembled, an end of the side springs 1452 may be inserted into the arm 1440 so that the side springs 1452 are compressed between a side wall 1467 of the base portion 1460 and an inner wall of the arm 1440. In this manner, the arm 1440 may be continuously urged inward toward the battery receptacle area 1466.

Figure 17:
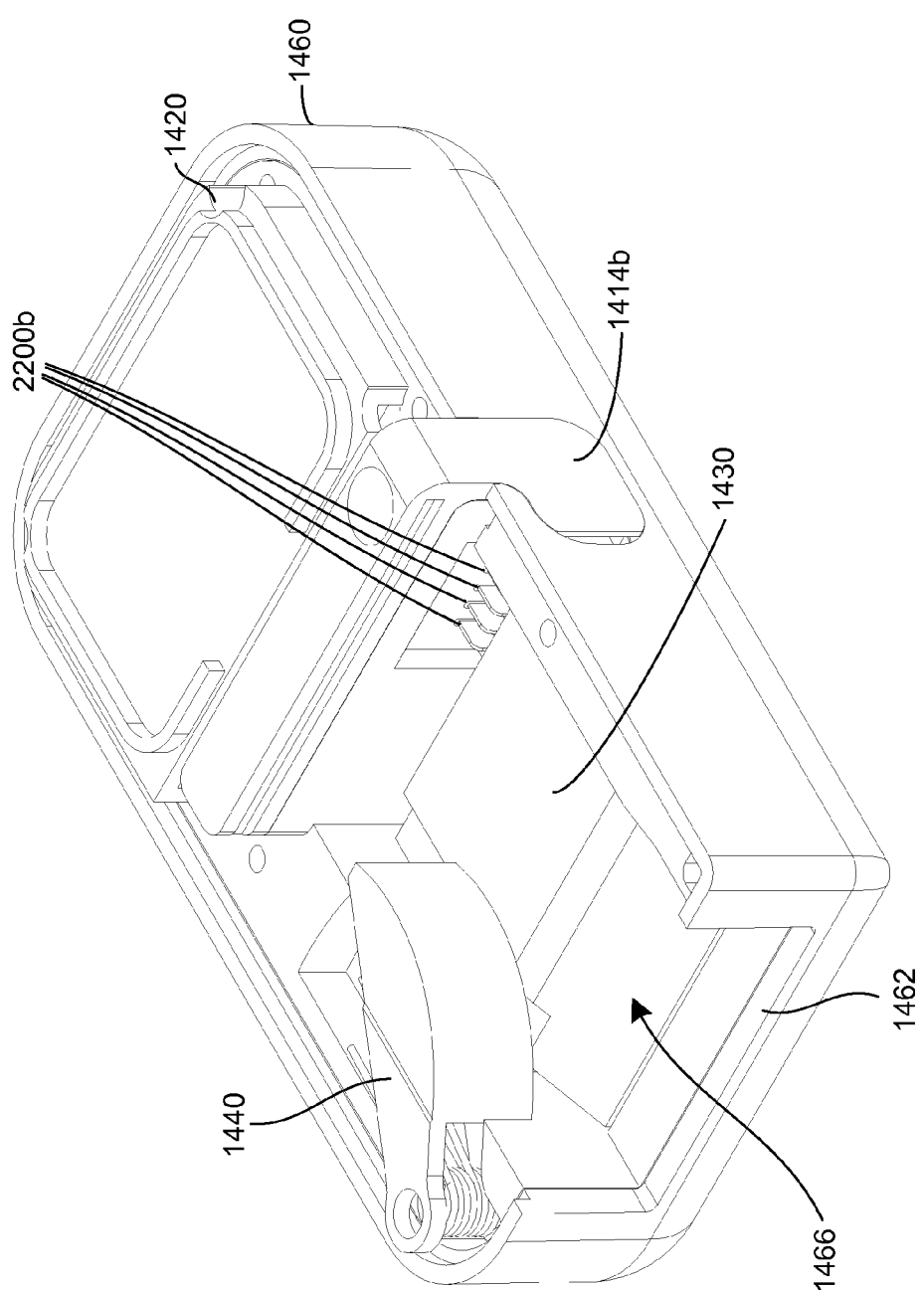
FIG. 17 is a perspective cross-sectional view of the second universal battery charger into which the customized battery adaptor has been inserted in accordance with certain aspects of the present invention.
Figure 18:
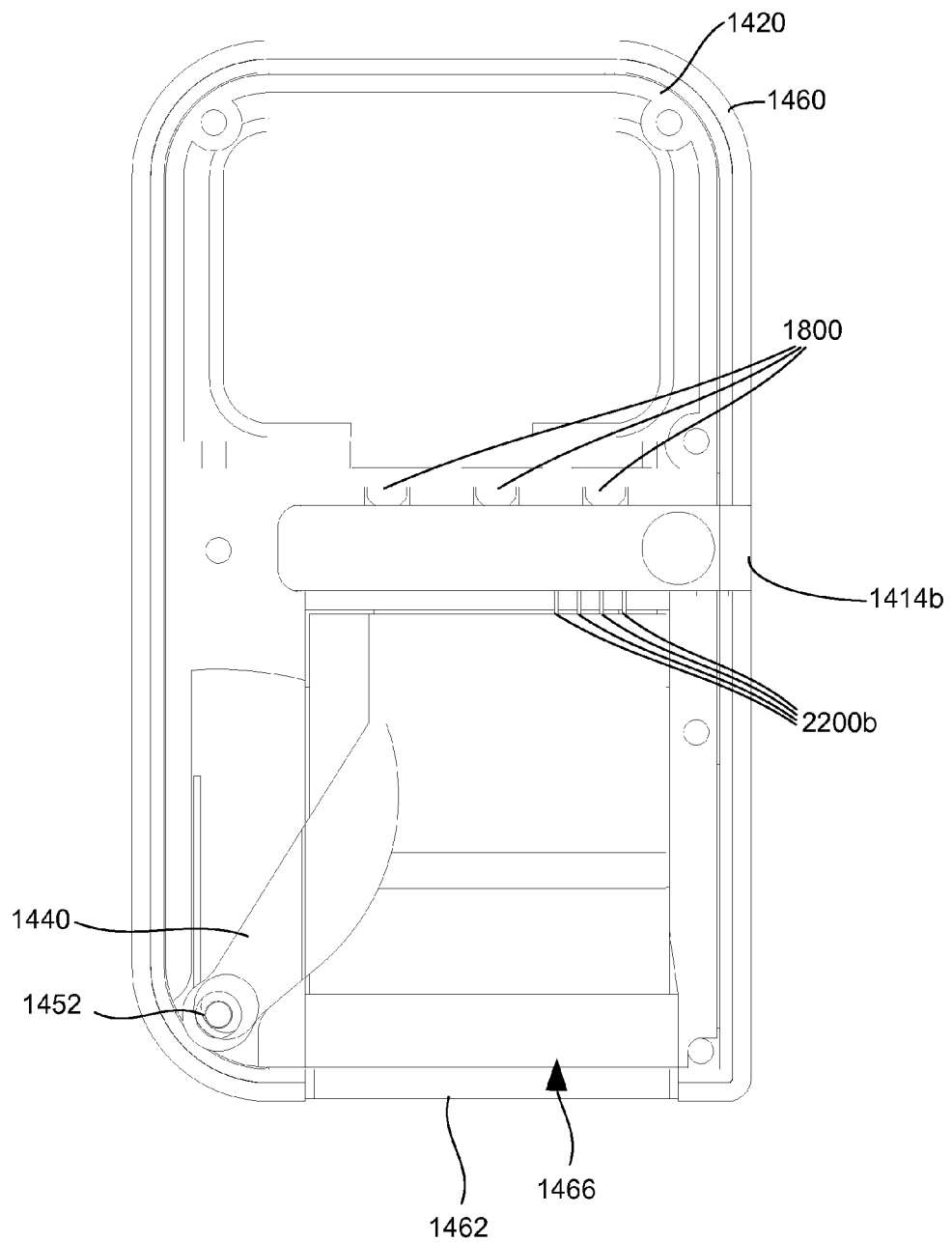
FIG. 18 is a top plan cross-sectional view of the second universal battery charger into which the customized battery adaptor has been inserted in accordance with certain aspects of the present invention.

The frame 1420, platform 1430, and arm 1444 may be coupled together by way of the various guides and slots and mounted into the base portion 1460 of the universal battery charger 1400 with the bottom and side springs 1450 and 1452 respectively positioned as described above. The cover 1402 may be secured to the base portion 1460 in order to secure and maintain the internal components and circuitry of the universal battery charger 1400 therein. As shown in FIGS. 17 and 18, for example, the platform 1430 and the arm 1440 extend into the battery receptacle area 1466 and are capable of receiving a battery of varying dimensions. The platform 1430 and the arm 1440 may include slanted or beveled leading surfaces, for example, to further enable the easy insertion and acceptance of the battery into the battery receptacle area 1466.

Figure 19:
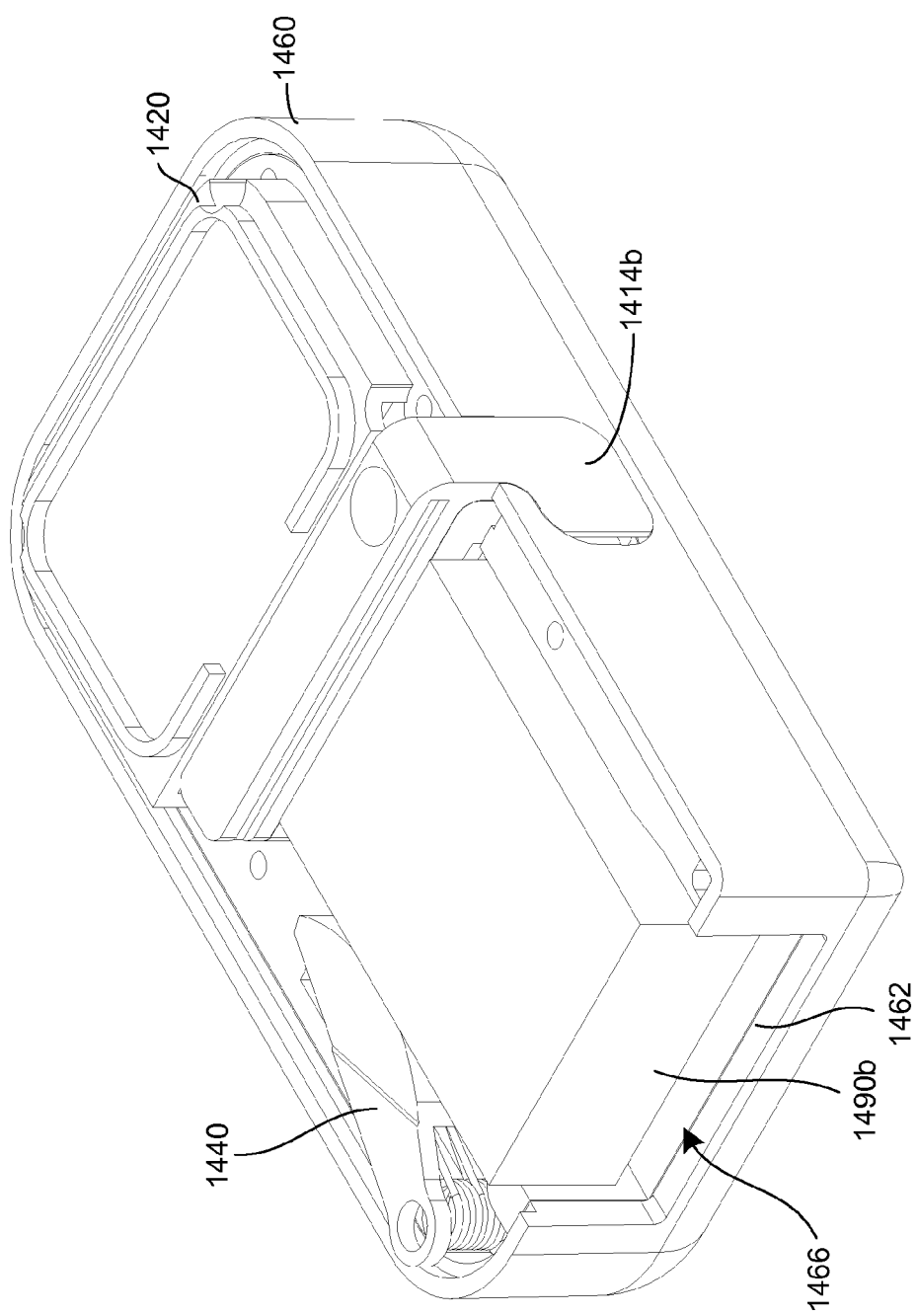
FIG. 19 is a perspective cross-sectional view of the second universal battery charger into which a third battery has been inserted in accordance with certain aspects of the present invention.
Figure 20:
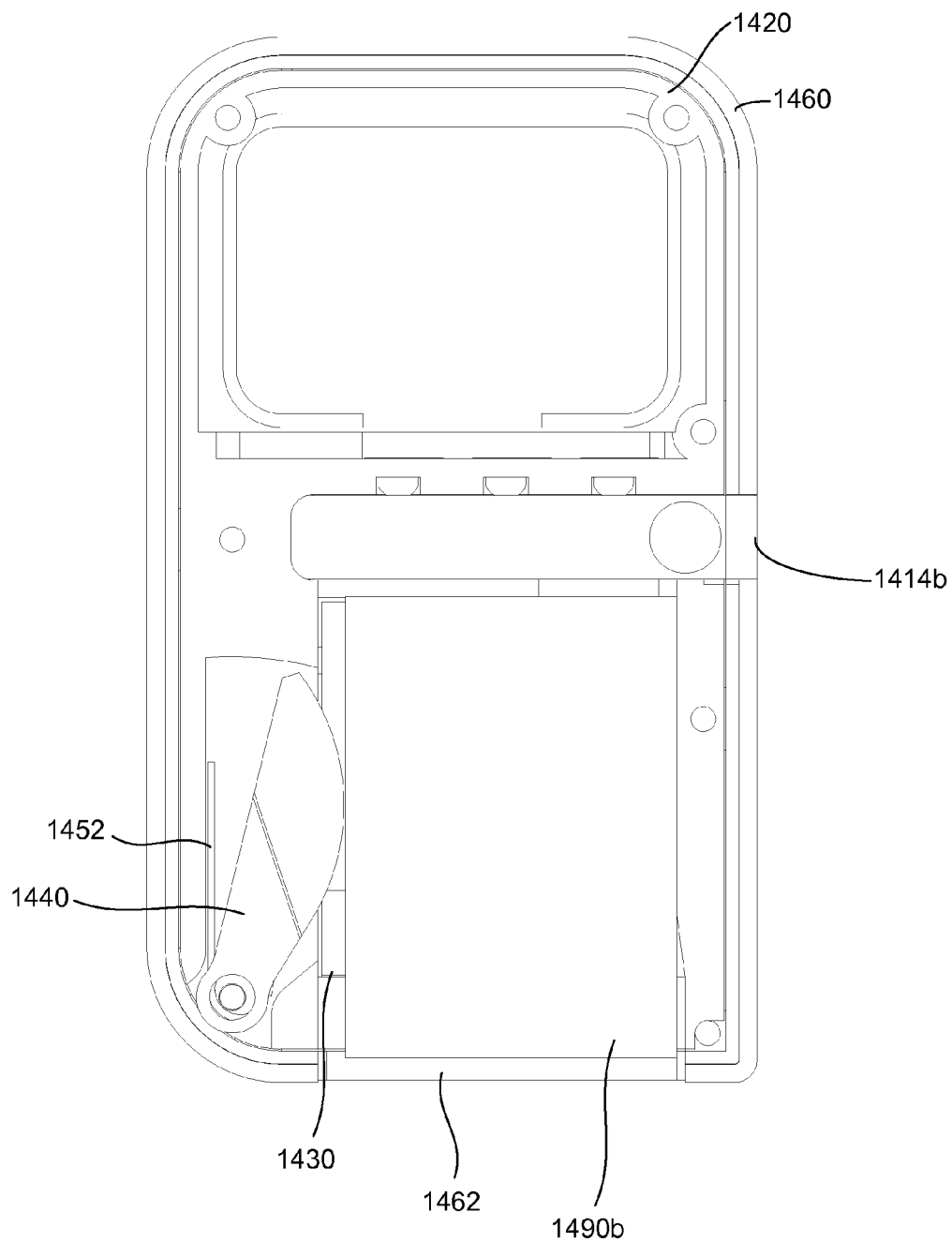
FIG. 20 is a top plan cross-sectional view of the second universal battery charger into which the third battery has been inserted in accordance with certain aspects of the present invention.

As shown in FIG. 19, the battery 1490b with the contacts 1492b may be inserted through the opening 1462 of the base portion 1460 and received into the battery receptacle area 1466 so that contacts 1492b on the battery 1490b engage the contacts 2200b on the battery interface 1414b, and through which, the contacts 1800. The battery 1490b may be effectively clamped vertically between a lower surface of the cover 1402 and an upper surface of the platform 1430 as a result of the force of the bottom spring 1450 being distributed by the platform 1430 to exert a substantially uniform upward pressure against a lower surface of the battery 1490b. Similarly, as shown in FIGS. 19 and 20, the battery 1490b may be effectively clamped horizontally between the arm 1440 and the frame 1420 or a sidewall of the base portion 1460 as a result of the force of the side springs 1452 being distributed by the arm 1440 to exert a substantially uniform inward pressure against a side surface of the battery 1490b. The dually applied and distributed spring forces may simultaneously maintain the battery 1490b in a secure vertical and horizontal charging position.

Figure 21:
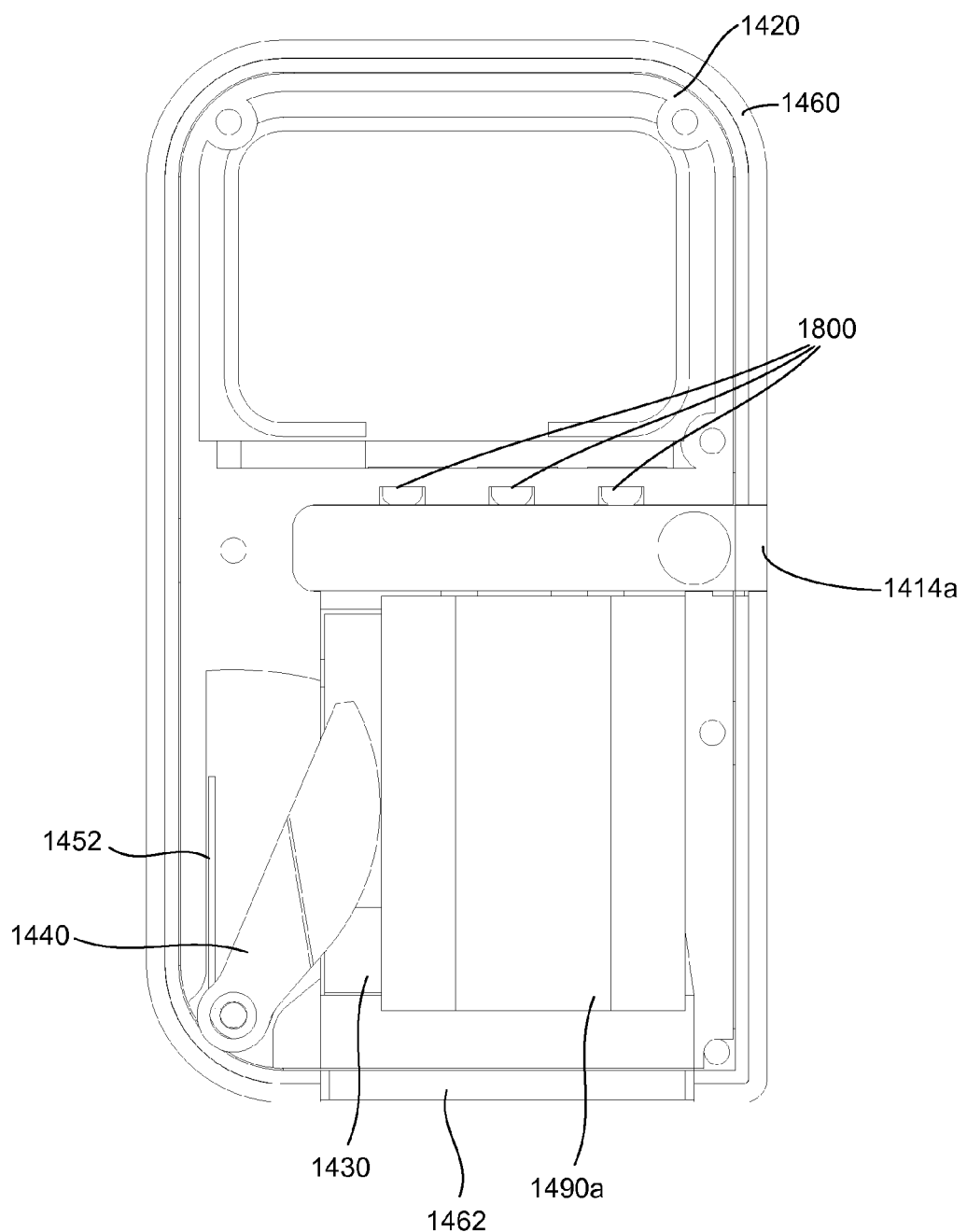
FIG. 21 is a top plan cross-sectional view of the second universal battery charger into which a fourth battery has been inserted in accordance with certain aspects of the present invention.

Referring to FIG. 21, the battery 1490a that is of a smaller size than the battery 1490b may be inserted into the opening 1462 of the bottom housing 1460. As described above for the battery 1490b, the battery 1490a may be maintained in an effective vertical charging position by being held secure against the bottom of the cover 1402 due to the force of the bottom spring 1450 on the platform 1430 exerting a distributed upward pressure against a lower surface of the battery 1490a, so that the battery 1490a may be maintained in an effective horizontal charging position by being held secure against the frame 1420 or a side wall of the base portion 1460 due to the force of the springs 1452 on the arm 1440 exerting a distributed inward pressure against a side surface of the battery 1490a. In the case of a smaller battery, the access slot 1406 may provide access for a user to effect positioning of the battery in the battery receptacle area 1466. In another aspect of the present invention, the battery may be positioned in the battery receptacle area 1466 simply by direct longitudinal pushing of a distal end of the battery through the opening 1462.

The universal battery charger 1400 may be configured with a fold-away wall plug similar to the fold-away wall plug 170 as shown in FIGS. 1-4 of the previously described embodiment, the wall plug 170 may be built into the base portion 160 with a pair of prongs that is electrically connected to the main circuit board. The fold-away wall plug may pivot from a first position, where the pair of prongs is substantially flush with a lower surface of the bottom housing 1460, to a second position, where the pair of prongs may be deployed to extend substantially orthogonally from the lower surface of the outer housing 1460 to be inserted into a power outlet. In one aspect, the prongs of the fold-away wall plug may be changed to other shapes for compatibility with the power outlets of any country.

The previous description is provided to enable any person skilled in the art to understand fully the full scope of the disclosure. Modifications to the various configurations disclosed herein will be readily apparent to those skilled in the art. Unless specifically stated otherwise, the terms "some" or "at least one" refer to one or more elements. All structural and functional equivalents to the elements of the various aspects described throughout this disclosure that are known or later come to be known to those of ordinary skill in the art are expressly incorporated herein by reference and are intended to be encompassed by any claims that may be directed to the various aspects. Moreover, nothing disclosed herein is intended to be dedicated to the public regardless of whether such disclosure is explicitly recited by any claims.

What is claimed is:

1. A battery charger, comprising:
 a housing defining a battery receptacle area configured to receive a battery therein;
 a piston;
 a moveable platform, wherein the piston and the platform are positioned within the housing and simultaneously urged in substantially orthogonal directions toward the battery receptacle area; and
 prongs configured to extend from the housing and electrically connect a power source to the battery when the battery is received in the battery receptacle area and engaged by the piston and moveable platform.

2. The battery charger of claim 1, wherein the housing further comprises a base portion and a cover secured to the base portion.

3. The battery charger of claim 2, wherein the base portion comprises an opening that provides communication from an exterior of the battery charger to the battery receptacle area.

4. The battery charger of claim 1, further comprising a frame member having at least one horizontal slot, wherein the piston comprises at least one guide slidably engaged with the at least one horizontal slot to control a horizontal movement of the piston.

5. The battery charger of claim 4, wherein the frame member further comprises at least one vertical slot and the platform comprises at least one guide slidably engaged with the at least one vertical slot to control a vertical movement of the platform.

6. The battery charger of claim 1, further comprising at least one spring in abutment with the piston, the at least one spring providing a force to urge the piston toward the battery receptacle area.

7. The battery charger of claim 6, wherein the piston comprises at least one spring seat, and wherein an end of the spring is securely mounted by the spring seat in abutment with the piston.

8. The battery charger of claim 7, wherein the spring seat comprises a cylindrical bore extending into a side surface of the piston, the cylindrical bore having a diameter slightly greater than or equal to an outside radial diameter of the spring.

9. The battery charger of claim 1, further comprising at least one bottom spring in abutment with the platform, the at least one bottom spring providing a force to urge the platform toward the battery receptacle area.

10. The battery charger of claim 9, wherein the platform comprises at least one bottom spring seat, and wherein an end of the bottom spring is securely mounted by the bottom spring seat in abutment with the platform.

11. The battery charger of claim 10, wherein the bottom spring seat comprises a cylindrical bore formed in a thicker portion of the platform, the cylindrical bore having a diameter slightly greater than or equal to an outside radial diameter of the bottom spring.

12. The battery charger of claim 10, wherein the housing further comprises a spring securing feature for securely mounting the other end of the bottom spring.

13. The battery charger of claim 1, further comprising a main circuit board and a display circuit board contained within the housing, wherein the main circuit board controls the display circuit board to display a charge/discharge status of the battery.

14. The battery charger of claim 13, wherein the housing further comprises a window and the display circuit board is visible through the window.

15. The battery charger of claim 3, wherein the cover comprises an access slot that expands the opening into the battery receptacle area.

16. A method for charging a battery, comprising:
 connecting a pair of prongs of a battery charger to a power source; and
 placing a battery into a battery receptacle area of the battery charger, wherein the battery is simultaneously maintained in a vertical charging position by a movable platform exerting a substantially uniform vertical pressure against a lower surface of the battery and in a horizontal charging position by a piston exerting a substantially uniform horizontal pressure against a side surface of the battery.

17. A method for charging a battery, comprising:
 connecting a pair of prongs of a battery charger to a power source;
 placing a battery into a battery receptacle area of the battery charger, wherein the battery is simultaneously maintained in a vertical charging position by a platform exerting a substantially uniform vertical pressure against a lower surface of the battery and in a horizontal charging position by a piston exerting a substantially uniform horizontal pressure against a side surface of the battery; and
 releasing the prongs from a position substantially flush with a lower surface of the battery charger to a position extending substantially orthogonally from the lower surface.

18. A method of manufacturing a battery charger assembly, comprising:
 providing a housing configured to define a battery receptacle for receiving a battery therein;
 providing a piston internal to the housing, wherein the piston is urged toward the battery receptacle area by a spring; and
 providing a moveable platform internal to the housing, wherein the moveable platform is urged toward the battery receptacle by a spring, and wherein a direction in which the piston is urged is substantially orthogonal to the direction in which the platform is urged.

19. The method of claim 18, further comprising:
 integrating a pair of prongs into the assembly so that an electrical current may be delivered from a power source to the battery when the battery is received into the battery receptacle area and engaged simultaneously by the piston and the platform.

* * * * *